V. V. VEENSCHOTEN.
FEED WATER REGULATOR VALVE.
APPLICATION FILED DEC. 9, 1918.
1,384,414. Patented July 12, 1921.
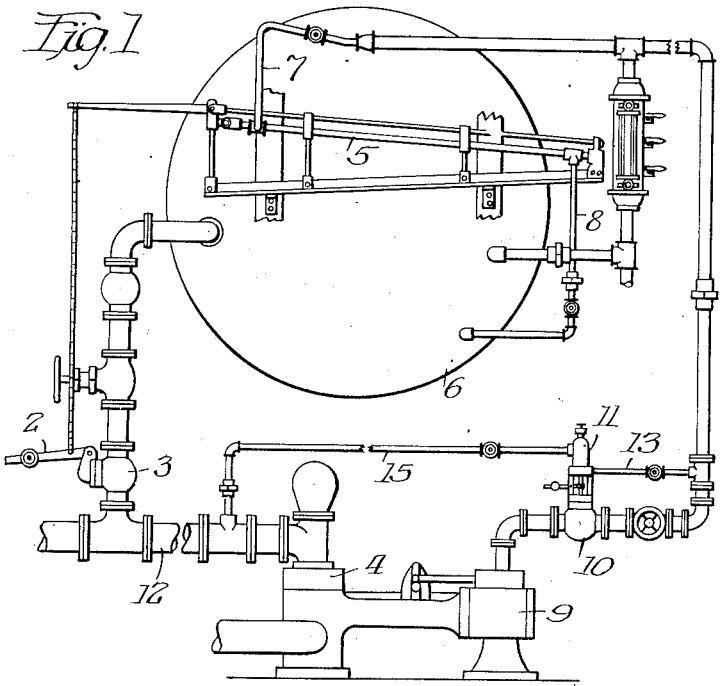
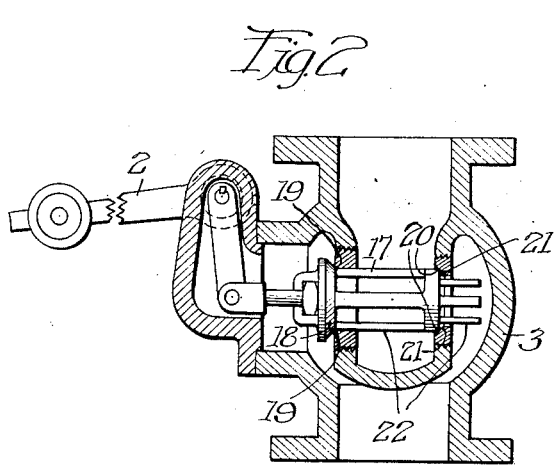
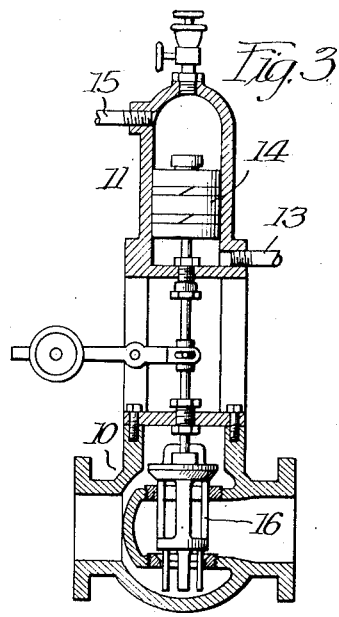
Witness:
L. W. Novander.
Inventor
Vincent V. Veenschoten
By E. J. Andrews
Atty

UNITED STATES PATENT OFFICE.

VINCENT V. VEENSCHOTEN, OF ERIE, PENNSYLVANIA, ASSIGNOR TO NORTHERN EQUIPMENT COMPANY, OF ERIE, PENNSYLVANIA, A CORPORATION OF PENNSYLVANIA.

FEED-WATER-REGULATOR VALVE.

1,384,414.  Specification of Letters Patent.  Patented July 12, 1921.

Application filed December 9, 1918. Serial No. 265,871.

*To all whom it may concern:*

Be it known that I, VINCENT V. VEENSCHOTEN, a citizen of the United States, residing at Erie, in the county of Erie and State of Pennsylvania, have invented certain new and useful Improvements in Feed-Water-Regulator Valves, of which the following is a specification.

This invention relates to feed-water regulator systems, and more particularly to the type of valves used in such systems. It has for its object in general the production of a suitable valve for the purpose, which is at all times balanced whether opened or closed, which operates with substantially no friction, and which will, when closed, allow substantially no leakage; the valve to be used in combination with feed-water regulator systems, so that the feeding of the water to the boiler may be more completely and more sensitively controlled with reference to the needs thereof.

Of the accompanying drawings Figure 1 is an elevation, more or less diagrammatic, of a boiler equipped with a feed-water system which embodies the features of my invention. Fig. 2 is a central longitudinal section of the feed-water valve used with the system. Fig. 3 is a central longitudinal section of the feed-water pump governor and valve used with the system.

Any suitable form of feed-water regulator may be used. I prefer for the purpose the thermostatic tube regulator 5 mounted on the boiler 6 in an ordinary manner, and connected in any suitable manner with the arm 2, which operates the feed-water valve 3; together with any suitable form of feed-water pump 4, operated by the steam engine 9 which is controlled by the steam valve 10, and which in turn is controlled by the pump governor 11.

As is well understood, the thermostatic tube 5 is connected to the boiler 6 above and below the water level, by the pipes 7 and 8; and, as the water rises or sinks in the boiler it will rise or sink correspondingly in the tube 5, and the contraction or expansion of the tube controls the position of the feed-water valve, and hence the flow of water into the boiler. At the same time the pressure of the water in the pipe 12, through which the water passes from the pump 4 to the boiler, is controlled by the governor by means of the steam pressure through the pipe 13 acting on the lower side of the piston 14 of the governor, and the water pressure through the pipe 15 acting on the upper side of the piston 14; the piston in turn controlling the position of the steam valve plunger 16 in the steam valve 10.

The particular valve which I use in this combination for controlling the flow of water from the pump to the boiler, comprises a reciprocating plunger 17 which has an annular beveled seat 18, which, when closed, is seated upon the annular square edge 19 of the valve casing. The plunger also has at its other end the annular square seat 20 on the plunger, which, when the valve is closed, is seated upon the annular beveled seat 21 of the valve casing. By this arrangement both seats of the plunger may be made exactly the same size, so that, with the valve closed, the pressure tending to open the valve will be exactly the same as the pressure tending to hold it closed. At the same time, with the beveled seats, tight ground joints are obtained, so that leakage is substantially prevented. Also by this arrangement the guides 22 of the plunger may be made substantially smaller than the ports, as leakage when the plunger is unseated is not material, and hence friction due to the guides is eliminated.

With the ordinary form of balanced plunger valves either there must be serious leakage when the valve is closed or the plunger must fit so snugly in the ports as to produce serious friction not only when the valve is being opened, but also when moved in any position; and even then the leakage when the valve is closed is necessarily greater than with the beveled valve seats shown herein.

One advantage of this valve in combination with a feed-water regulator is to make more sensitive the movement of the valve with reference to the elevation of the water level in the boiler. With the ordinary single-seated valve, as it is unbalanced in any position of the valve, there is a decided tendency of the water, due either to its static pressure or its kinetic energy, or both, to force the valve in one direction. As a consequence there is more or less springing of the various parts of the regulator before the proper operation of the valve results, particularly when the valve is being opened, and also when a change in direction of the movement of the valve takes place due to a change in direction of the elevation of the water level. With this form of valve, so far as the valve plunger is concerned at least, there is no undesirable force of any nature acting on the valve so far as the water is concerned, either when the valve is closed or when it is opened. With a single seated valve also a very material difference in the force of the water on the valve occurs as soon as the valve passes from the closed to a partly opened position; while with the valve shown herein no such change occurs. Also with the ordinary form of balanced valve, inasmuch as in order to avoid serious leakage, it is necessary to have the plunger fit fairly snugly in the ports, the friction of the plunger in the ports is often very material. But a more serious objection to such valves is that serious leakage continues even when the valve is closed, so that in the operation of the system it becomes necessary to close an additional valve when the boiler is shut down, or even at times when the load on the boiler is reduced to such an amount that danger of flooding, because of the leakage, arises. In general my combination produces a feed-water regulator system which is self contained, as it automatically and completely controls the flow of water to the boiler, and which is so sensitive as to produce a flow of water to the boiler exactly as needed to produce the most efficient results, or the results desired for any special reason by the operator in charge, as the movement of the valve at all times, even as it closes and opens, is extremely sensitive to the changes in the water level elevation in the boiler.

Somewhat similarly is the combination of the pump governor and steam valve illustrated herein. The valve plunger shown is similar to the feed-water valve plunger, and it is extremely sensitive to differences in pressure of the water and of the steam acting on the piston of the governor; so that, so far as the plunger is concerned, at least, there is substantially no sticking or retarding tendency, even when the valve plunger is passing onto or off from its seats. As a consequence of this the pressure of the discharge water of the pump is maintained much more nearly the desired amount than is the case with either a single seated valve or the ordinary form of balanced plunger valves. And at the same time, when occasion arises the pump will be entirely shut down by the closing of the valve, because of the elimination of leakage; while with the ordinary form of plunger valve this leakage is frequently sufficient to keep the pump in operation, and in any event causes material waste of steam.

By the combination of the two valves, in connection with the feed-water regulator and pump governor, the sensitiveness of the flow of water to the needs of the boiler is increased, because, not only is the desired position of the feed-water valve plunger, with reference to the water level elevation, better maintained; but also the excess pressure of the feed-water on the inlet of the feed-water valve over that of the outlet of the valve, is maintained much more nearly constant than by means of the ordinary pump governing systems and hence the flow of water through the feed-water valve is maintained more nearly constant for any given position of the valve, it being readily understood that if the excess pressure of the inflowing water over that of the outflowing water is not constant there will be a variation in flow through the valve even though there is no variation in the opening of the ports.

I claim as my invention:

1. A feed-water valve casing, said casing having an inlet and an outlet, a partition in said casing separating the inlet of said casing from its outlet, said partition having two opposing ports therethrough, and a valve plunger slidably mounted in and adapted to open and close said ports, said plunger having an annular beveled seat adjacent one end, and an annular square-edged seat adjacent the other end, one of said ports having an annular beveled seat and the other port having an annular square edged seat, the respective beveled seats being arranged to coöperate with said square seats when said ports are closed by said plunger.

2. A feed-water valve casing, said casing having an inlet and an outlet, a partition in said casing separating the inlet of said casing from its outlet, said partition having two opposing ports therethrough, and a valve plunger slidably mounted in and adapted to open and close said ports, said plunger having an annular beveled seat adjacent one end, and an annular square-edged seat adjacent the other end, one of said ports having an annular beveled seat and the other port having an annular square-edged seat, the respective beveled seats being arranged to coöperate with said square seats when said ports are closed by said plunger, the circumference of said square-edged seats being substantially equal.

In testimony whereof, I hereunto set my hand.

VINCENT V. VEENSCHOTEN.